March 13, 1962  J. W. RYAN  3,024,662
ACCELEROMETER OF THE INERTIA ELEMENT DISPLACEMENT TYPE
Filed Jan. 28, 1960

Inventor
JOHN W. RYAN

By R. I. Tompkins
Attorney

United States Patent Office 3,024,662
Patented Mar. 13, 1962

3,024,662
ACCELEROMETER OF THE INERTIA ELEMENT DISPLACEMENT TYPE
John W. Ryan, Los Angeles, Calif., assignor, by mesne assignments, to the United States of America as represented by the Secretary of the Navy
Filed Jan. 28, 1960, Ser. No. 5,309
2 Claims. (Cl. 73—516)

The present invention relates to an accelerometer of the inertia element displacement type and more particularly to an accelerometer of the inertia element displacement type having an inertia element and gas elements disposed within a capillary tube so that upon a change of the velocity component along the horizontal axis of the tube, the inertia element is displaced along the axis thereby indicating the rate of change of the velocity.

Heretofore accelerometers of the inertia element displacement type have been inoperable or erratic when the inertia element was in certain positions. Further, such accelerometers, especially those employed to measure large accelerations, required a large displacement area for the inertia element thereby rendering the device too cumbersome for areas of limited space and too heavy where weight is to be kept at a minimum. Also such accelerometers have been unsuitable without recalibration to render a true indication of acceleration after extensive use because of the wearing of bearings and other components. The present invention overcomes the above and other defects in the teachings of the prior art by sealing the inertia element with gas elements on each end thereof in a capillary tube. The present invention will never be erratic in its operation regardless of the position imposed since the inertia element will be retained in an operable condition due to the capillary action of the tube thereon. Further, the invention is suitable for small areas even though large accelerations are to be measured in that the device can be designed to a small area by limiting the area of operable displacement required by the inertia element. This design can be accomplished by increasing the pressure or reducing the volume of the gas elements thereby rendering the gas elements a more effective damper to the displacement of the inertia element. Also the invention has no wearing components so that regardless of the extent of use the device will not require recalibration to always render an accurate indication of acceleration.

An object of the present invention is the provision of a small lightweight device for the measurement of acceleration even though the magnitude of the acceleration to be measured is large.

Another object is to provide a device which will indicate the true acceleration component along its longitudinal axis regardless of its position in space.

A further object of the invention is the provision of a device which will never require recalibration in order to indicate true acceleration regardless of the extent of use thereof.

Other objects and many attendant advantages of this invention will be readily appreciated as the same becomes better understood by reference to the following detailed description when considered in connection with the accompanying drawings wherein:

FIG. 1 shows a longitudinal cross-sectional view of the device showing calibrations on the outside surface of the tube.

FIGS. 2 and 3 each show a longitudinal cross-sectional view of the device employing electrodes spaced at predetermined intervals for a desired control of or indication within a circuit.

Figure 1:
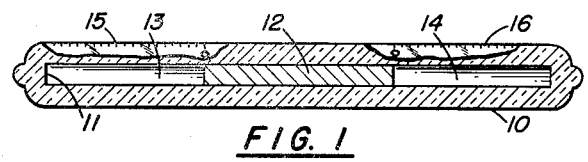

Referring now to the drawings, wherein like reference characters designate like or corresponding parts throughout the several views, a general concept of the invention can be best appreciated by reference to FIG. 1. Here an inertia element 12 and two gas elements 13 and 14 are disposed within a completely sealed capillary chamber 11 of a tube 10. FIGURE 1 further illustrates an embodiment of the invention wherein the displacement of the inertia element 12 along the longitudinal axis of the tube 10 is measured by two series of marks 15 and 16 each mark calibrated to represent a degree of acceleration. While FIG. 1 shows the series of marks 15 and 16 commencing at each end of the inertia element 12 it is to be understood that the same result can be accomplished by commencing both series of marks 15 and 16 at either end of the inertia element 12. Further, indicia separate and apart from the tube 10 may be associated therewith for measuring purposes.

Figure 2:
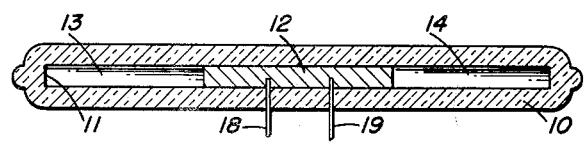

A further embodiment of the invention is shown in FIG. 2 wherein electrodes 18 and 19 from a circuit (not shown) pierce the wall of tube 10 at a predetermined spacing one from the other and partially extend into the inertia element 12.

Figure 3:
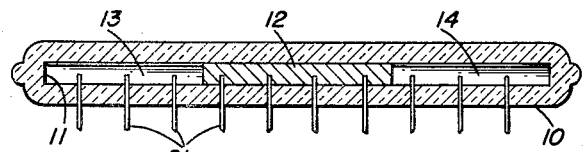

Another embodiment of the invention is illustrated in FIG. 3 wherein a plurality of electrodes similar to electrode 21 are at one end connected to a circuit or circuits (not shown) and at the other end pierce the wall of tube 10 and partially enter chamber 11 forming contact points of a predetermined spacing according to the desired degrees of acceleration to be indicated or a desired switching function to be performed upon the circuit or circuits.

Figure 4:
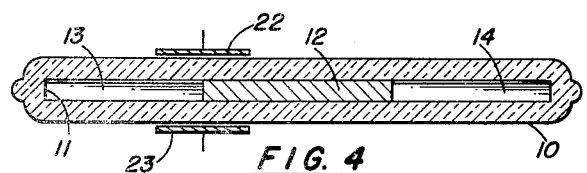
FIG. 4 shows a longitudinal cross-sectional view of the device employing two plates connected to a circuit, the capacitance between which will vary according to the displacement of the inertia element.

Still another embodiment of the invention is illustrated in FIG. 4 wherein capacitance plates 22 and 23 are connected to a circuit (not shown) and are disposed parallel to and one on each side of the tube 10 within a predetermined proximity of the inertia element 12. It is to be understood that any suitable capacitance means can be used in lieu of plates 22 and 23 which will read a change in capacitance upon the displacement of the inertia element 12 along the longitudinal axis of the tube 10. It is to be further understood that a series of capacitance plates similar to plates 22 and 23 can be disposed at a predetermined distance one from the other along the longitudinal axis of the tube 10 according to the desired degrees of acceleration to be indicated or a desired switching function to be performed upon the circuit or circuits.

Figure 5:
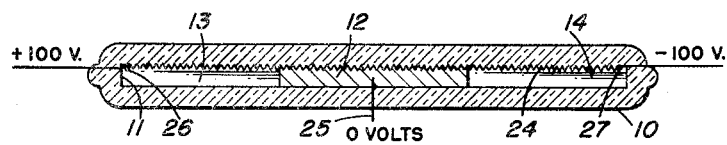
FIG. 5 shows a longitudinal cross-sectional view of the device employing a resistive element and an electrode.

Still another embodiment of the invention is illustrated in FIG. 5. Here an electrode 25 connected to a circuit (not shown) pierces the wall of tube 10 and partially extends into the inertia element 12. A resistive element 24 with an applied potential between its extremities 26 and 27 is longitudinally disposed in chamber 11 so as to make contact with electrode 25 only through the inertia element 12. A means within the circuit (neither of which is shown) is to be employed to indicate any change in potential between the electrode 25 and either extremity of the resistive element 26 or 27.

Figure 6:
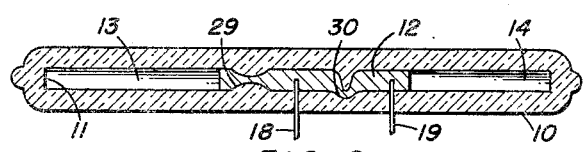
FIG. 6 shows a longitudinal cross-sectional view of the device employing various mechanical means having electrical analogues to dampen the movement of the inertia element.

A final embodiment of the invention is illustrated in FIG. 6 wherein it is desired to employ mechanical adaptations having electrical analogues. Here the inertia element 12 of a predetermined mass representing an electrical inductance or other electrical analogue is disposed in a chamber 11, the chamber 11 having either a smaller diameter 29 or constriction 30 or both, each representing an electrical resistance or other electrical analogue. Gas elements 13 and 14 each are of a predetermined pressure and volume representing an electrical capacitance or other electrical analogue. While FIG. 6 illustrates electrodes 18 and 19 as a means for indication of the displacement of inertia element 12 it is to be understood that any of the embodiments shown in FIG. 1 and FIGS. 3–5 for indication of the displacement can be employed.

The construction of the tube 10 can be of any suitable material such as glass or plastic and the inertia element can be of any fluid but preferably mercury. The gas elements 13 and 14 can be of any known gas.

In the operation of the device the function of the inertia element can be best understood by reference to FIG. 1. Upon a change of velocity along the longitudinal axis of tube 10, inertia element 12 will be correspondingly displaced within chamber 11 along the same axis being retarded in its displacement by a differential in pressure between the gas elements 13 and 14. When the force of acceleration is removed from inertia element 12 the gas elements 13 and 14 will seek an equalized pressure thereby returning inertia element 12 to its zero acceleration position. In the embodiment of the invention shown in FIG. 1 the magnitude of the acceleration can be determined by noting the amount of displacement of the inertia element 12 along the appropriate scale 15 or 16.

In the embodiment shown in FIG. 2 electrodes 18 and 19 are in closed circuit relationship when there is no acceleration but upon the application of a predetermined acceleration inertia element 12 is displaced beyond either electrode 18 or 19 causing a disconnection between electrodes 18 and 19. Upon disconnection a circuit (not shown) will indicate the degree of acceleration or be switched in a predetermined manner.

In the embodiment shown in FIG. 3 the electrodes similar to electrode 21 are in closed or open circuit relationship depending upon the position of the inertia element 12 within chamber 11. Upon a predetermined displacement of inertia element 12 the electrodes will be connected or disconnected or some of the electrodes may be connected and others disconnected indicating in an electrical circuit (not shown) a degree of acceleration or performing a desired switching function within said circuit.

In the embodiment shown in FIG. 4 the capacity between plates 22 and 23 is telemetered to a circuit (not shown) which capacity varies according to the relative position of the inertia element 12 in relation to the plates 22 and 23. Thus by stationing the plates 22 and 23 in a predetermined position in relation to the tube 10 a degree of acceleration can be indicated or a circuit (not shown) can be switched in a predetermined manner.

In the embodiment shown in FIG. 5 upon the application of acceleration inertia element 12 will be displaced changing its relative position with respect to resistive element 24. Upon such displacement a corresponding change occurs in the potential between the electrode 25 and either extremity of the resistive element 26 or 27. This change in potential will be applied to a circuit (not shown) indicating a degree of acceleration or performing a switching function on said circuit.

The mechanical adaptations representing electrical analogues shown in FIG. 6 can be applied in each and every embodiment heretofore discussed. The mechanical adaptations comprise a predetermined mass of the inertia element 12, constrictions in the chamber 11, and pressure and volume of the gas elements 13 and 14 all according to desired electrical analogues to be imposed upon the displacement action of inertia element 12. The displacement of the inertia element 12 will indicate acceleration force modified by a function representing the electrical analogues.

Obviously many modifications and variations of the present invention are possible in the light of the above teachings. It is therefore to be understood that within the scope of the appended claims, the invention may be practiced otherwise than as specifically described.

What is claimed:

1. A device for measuring acceleration comprising a non-conductive tube having a smooth uniform bore and closed at both ends forming a completely sealed capillary chamber, a liquid conductive inertia element disposed within said chamber, a gas element disposed within said chamber between one end of said inertia element and one end of said chamber, a second gas element disposed within said chamber between the other end of said inertia element and the other end of said chamber, a plurality of electrodes from an electrical circuit piercing a wall of the tube normal to the bore and extending beyond the wall of the tube and into the bore forming contact points within said chamber of a predetermined spacing one from the other for activating said electrical circuit upon a predetermined displacement of the liquid inertia element along the longitudinal axis of said tube due to a change of the velocity component along said axis.

2. A device for measuring acceleration comprising a non-conductive tube closed at both ends forming a completely sealed capillary chamber, a liquid conductive inertia element disposed within said chamber, a gas element disposed within said chamber between one end of said inertial element and one end of said chamber, a second gas element disposed within said chamber between the other end of said inertia element and the other end of said chamber, a resistive element longitudinally disposed within said chamber and extending unbroken along the entire length of one wall of the tube, said resistive element having an applied voltage between its extremities, and an electrode located midway between the ends of the tube and piercing the wall of the tube opposite the resistive element to be in contact with said inertia element for indicating a change in potential between at least one extremity of said resistive element and said electrode upon a displacement of said inertia element along the longitudinal axis of said tube.

References Cited in the file of this patent

UNITED STATES PATENTS

| | | |
|---|---|---|
| 1,319,036 | Barus | Oct. 21, 1919 |
| 2,063,495 | Elsom | Dec. 8, 1936 |
| 2,386,777 | Bentley | Oct. 16, 1945 |
| 2,404,179 | King | July 16, 1946 |
| 2,588,424 | Speaker | Mar. 11, 1952 |
| 2,651,204 | Dickinson | Sept. 8, 1953 |
| 2,740,028 | Buckman | Mar. 27, 1956 |
| 2,746,295 | Lubkin | May 22, 1956 |
| 2,851,568 | Weiland | Sept. 9, 1958 |
| 2,938,390 | McFee | May 31, 1960 |

FOREIGN PATENTS

| | | |
|---|---|---|
| 404,799 | Germany | Oct. 23, 1924 |
| 131,184 | Great Britain | Aug. 21, 1919 |
| 197,222 | Great Britain | May 10, 1923 |
| 708,228 | Great Britain | Apr. 28, 1954 |
| 125,888 | Sweden | Aug. 30, 1949 |